(12) United States Patent
Haussner et al.

(10) Patent No.: US 7,193,183 B2
(45) Date of Patent: Mar. 20, 2007

(54) GLOW PLUG CONNECTOR AND SYSTEM WITH A COUPLING, GLOW PLUG CONNECTOR AND GLOW PLUG

(75) Inventors: Michael Haussner, Benningen (DE); Gerald List, Hemmingen (DE); Frank Pechhold, Ludwigsburg (DE); Hans Houben, Wuerselen (DE); Juergen Haefele, Hohenems (AT); Werner Jaeger, Hohenems (AT)

(73) Assignees: Beru AG, Ludwigsburg (DE); Hirschmann Automotive GmbH, Rankweil-Brederis (AT)

( * ) Notice: Subject to any disclaimer, the term of this patent is extended or adjusted under 35 U.S.C. 154(b) by 79 days.

(21) Appl. No.: 11/038,058

(22) Filed: Jan. 21, 2005

(65) Prior Publication Data

US 2005/0173395 A1    Aug. 11, 2005

(30) Foreign Application Priority Data

Jan. 20, 2004   (DE)   ..................... 10 2004 002 905

(51) Int. Cl.
*F23Q 7/22*    (2006.01)
(52) U.S. Cl. ...................... 219/267; 219/270
(58) Field of Classification Search ............... 219/267, 219/260, 270, 520; 221/143
See application file for complete search history.

(56) References Cited

U.S. PATENT DOCUMENTS 5,834,736 A * 11/1998 Kawamura ................. 219/270
7,015,698 B2 * 3/2006 Ponziani et al. ............. 324/402
2005/0173395 A1 * 8/2005 Haussner et al. ........... 219/270
2005/0174121 A1 * 8/2005 Ponziani et al. ............. 324/402

FOREIGN PATENT DOCUMENTS

| CH | 594 294 | 1/1978 |
|---|---|---|
| DE | 2 323 612 | 11/1974 |
| DE | 36 05 076 C2 | 8/1987 |
| DE | 100 23 064 A1 | 11/2001 |
| DE | 102 18 544 A1 | 11/2002 |
| EP | 0 989 367 A2 | 3/2000 |
| EP | 1 096 140 A2 | 5/2001 |
| WO | WO 02/08714 A1 | 1/2002 |

* cited by examiner

*Primary Examiner*—Daniel Robinson
(74) *Attorney, Agent, or Firm*—David S. Safran

(57) ABSTRACT

A glow plug connector for a glow plug with built-in sensor, especially built-in pressure sensor, comprising a casing made of an electrically insulating material, which can be placed onto the glow plug. Provided centrally in the casing is a high-current connection which is connected to the high-current contact of the heating devices of the glow plug when the connector is placed thereon. Sensor contacts are provided on the casing insulated with respect to the high-current connection for contacting the sensor connections of the built-in sensor when the connector is placed thereon. For sealing an O-ring is provided on the outside of the casing whereas a locking mechanism serves to deliver the withdrawal force which must be overcome so that a coupling placed thereon can be removed from the glow plug connector. The connector is part of a system with a glow plug connector and glow plug.

12 Claims, 7 Drawing Sheets

Fig. 4
A)
B)
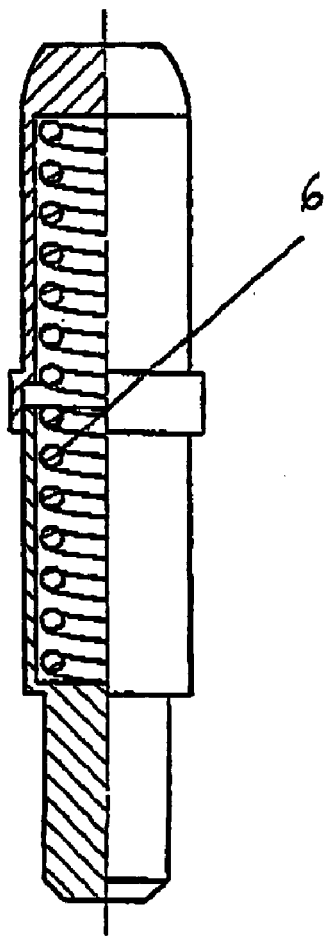
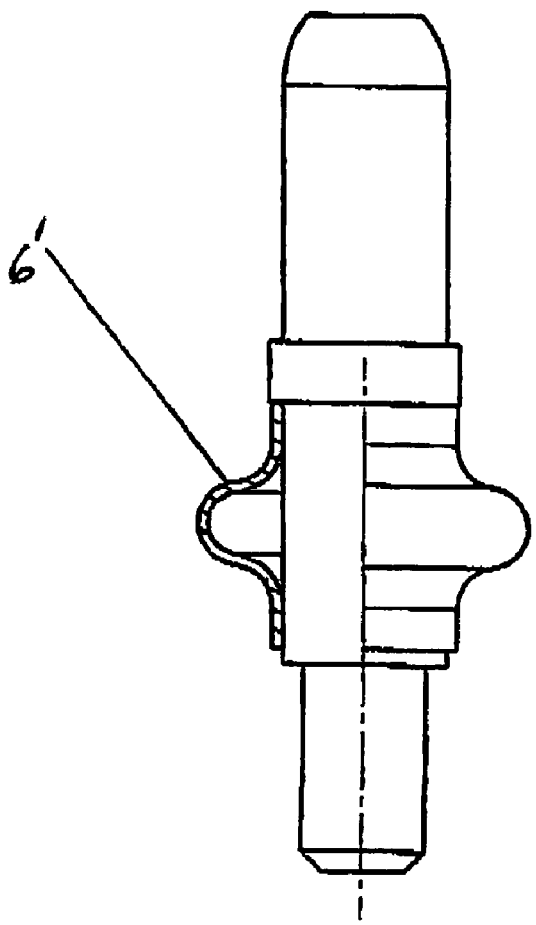

Fig. 5
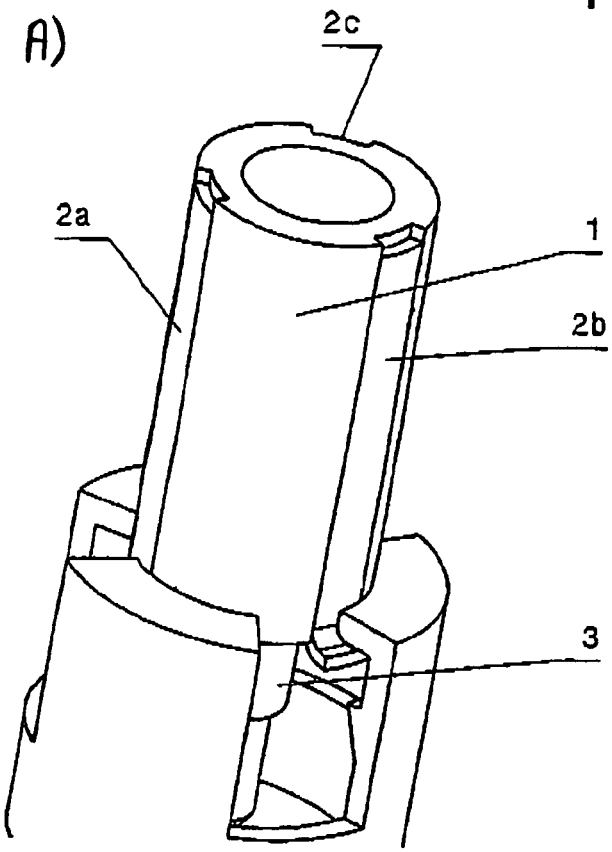
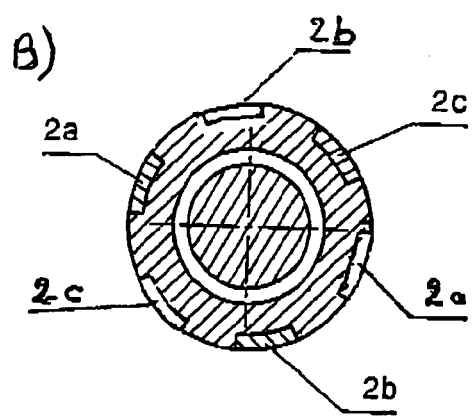 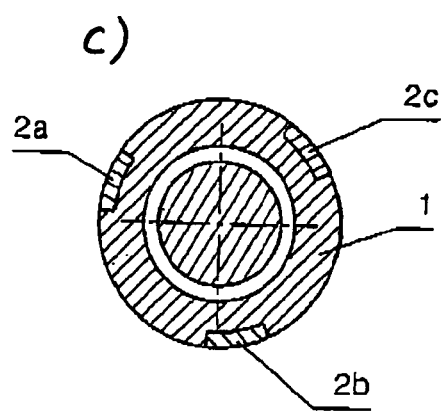

GLOW PLUG CONNECTOR AND SYSTEM WITH A COUPLING, GLOW PLUG CONNECTOR AND GLOW PLUG

BACKGROUND OF THE INVENTION

1. Field of Invention

The invention relates to a glow plug connector for a glow plug with built-in sensor, especially with built-in pressure sensor for diesel internal combustion engines.

2. Description of Related Art

In glow plugs provided with a built-in sensor, especially a pressure sensor, it has hitherto been usual to connect the heating devices of the glow plug and the sensor separately, that is to provide one glow plug connector for the functions of the glow plug, especially for the power supply of the heating devices of the glow plug, and a further connector for connection of the sensor.

SUMMARY OF THE INVENTION

Since this is recognisably expensive to use separate connectors as in the prior art, it is a primary object of the present invention to simplify the contact arrangement of a glow plug with a built-in sensor, especially a built-in pressure sensor.

This object is solved according to the present invention by the plug casing, which can be placed onto the glow plug, being made of an electrically insulating material, a high-current connection being arranged centrally in the casing and connected to a high-current contact of the heating devices of the glow plug when the connector is placed thereon, and sensor contacts being provided at the casing that are insulated with respect to the high-current connection and which are connected to the sensor connections when the connector is placed thereon.

According to the invention, a glow plug connector is thus provided which serves to connect a glow plug with a built-in sensor and which provides for the contacting of the heating devices of the glow plug and the sensor of the glow plug. In this case, the contacts of the heating devices of the glow plug and the sensor are integrated in the connector so that only one single connector is required to connect the glow plug with built-in sensor.

Especially preferred further developments and embodiments of the glow plug connector according to the invention are described below.

In some embodiments it is especially possible to select the position of the coupling to be placed on the glow plug connector according to the invention arbitrarily over the total angular range of 360°.

In addition, in a ring-shaped arrangement of the sensor contacts, only a very small space is required. On the other hand, in known flat connectors, the contacts must be configured over very broad area.

If one of the sensor contacts is arranged inside the connector casing, the connector can be constructed with an even smaller configuration.

In one stepped arrangement of the sensor contacts, at increasingly somewhat larger diameters, very simple assembly of the sensor contacts is possible.

If the sensor contacts are arranged perpendicular to the connector casing, the plug position of the coupling can no longer be freely selected, but as a result of the doubling of the sensor contacts, a doubling of the possible plug positions can be achieved, which are achieved, for example, by rotation through 120°. A corresponding multiplication of the sensor contacts results in a correspondingly larger number of possible plug positions.

By the arrangement of a seal, it is possible to protect the system comprising the coupling and glow plug connector against environmental influences.

Furthermore, if the glow plug high-current connection is constructed to be resilient or is spring-mounted, it is possible to decouple the movements of the heating rod in the glow plug from the glow plug connector.

Especially preferred embodiments of the invention are explained in detail below with reference to the accompanying drawings.

BRIEF DESCRIPTION OF THE DRAWINGS

FIGS. 4A & 4B are, respectively, a partial sectional view and a perspective view of a flexible high-current contact or a spring high-current contact of one exemplary embodiment of the invention, FIG. 5A is a perspective view of a fourth exemplary embodiment of the invention and FIGS. 5B & 5C are sectional views of two variants thereof.

DETAILED DESCRIPTION OF THE INVENTION

Figure 1:
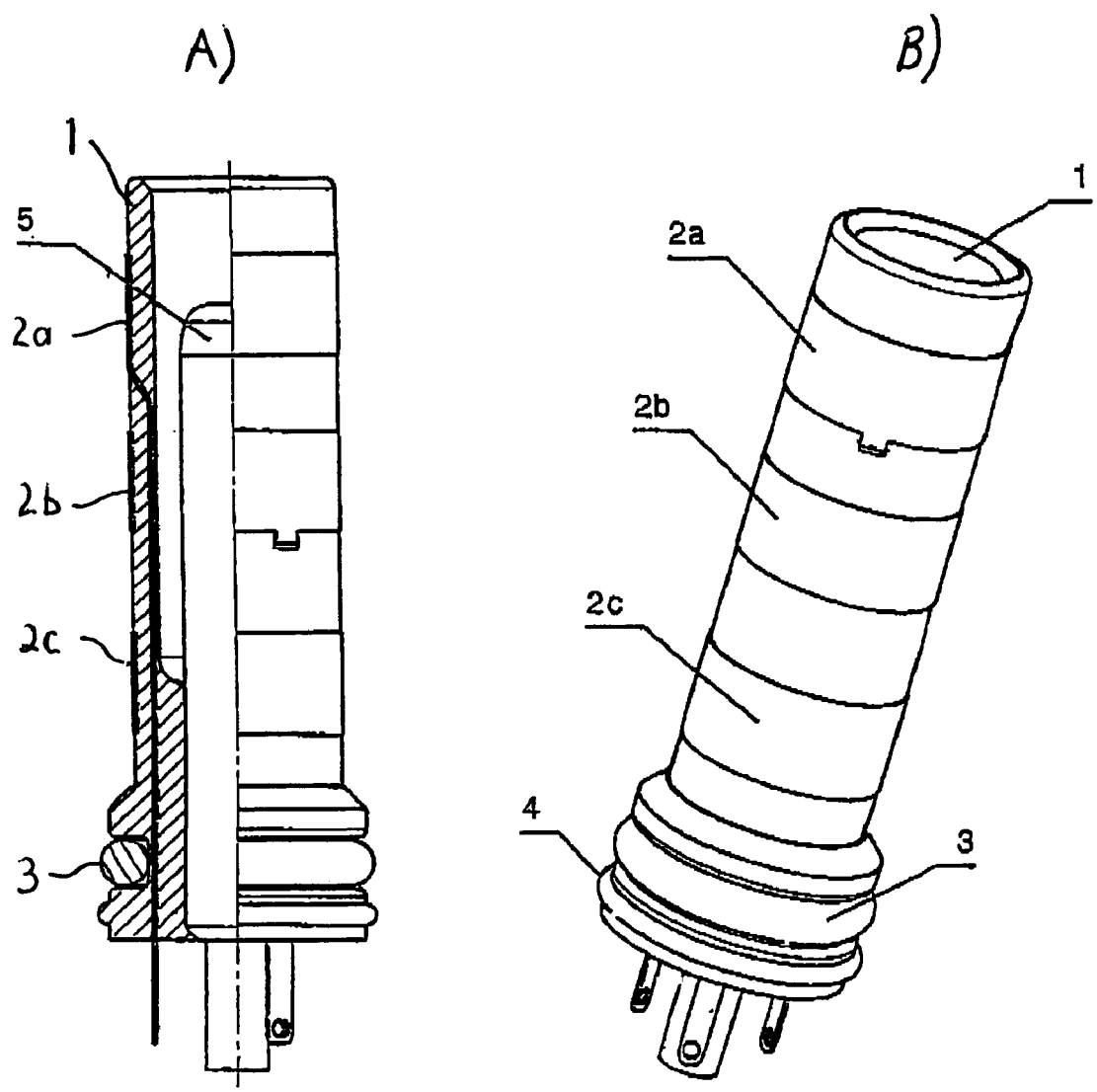
FIGS. 1A & 1B are, respectively, a partial sectional view and a perspective view of a first exemplary embodiment of the invention.

The first exemplary embodiment of the glow plug connector according to the invention shown in FIG. 1 for placing on a glow plug with built-in sensor, especially a built-in pressure sensor, comprises a casing 1 made of an electrically insulating material, especially a plastic material, which can be placed on the glow plug.

Provided centrally in the casing 1 is a high-current connection 5, especially in cylindrical form. The high-current connection 5 is connected to the high-current contact of the heating devices of the glow plug when the connector is placed on the glow plug. The high-current connection 5 corresponds to the corresponding standard high-current connection for conventional glow plugs.

Figure 6:
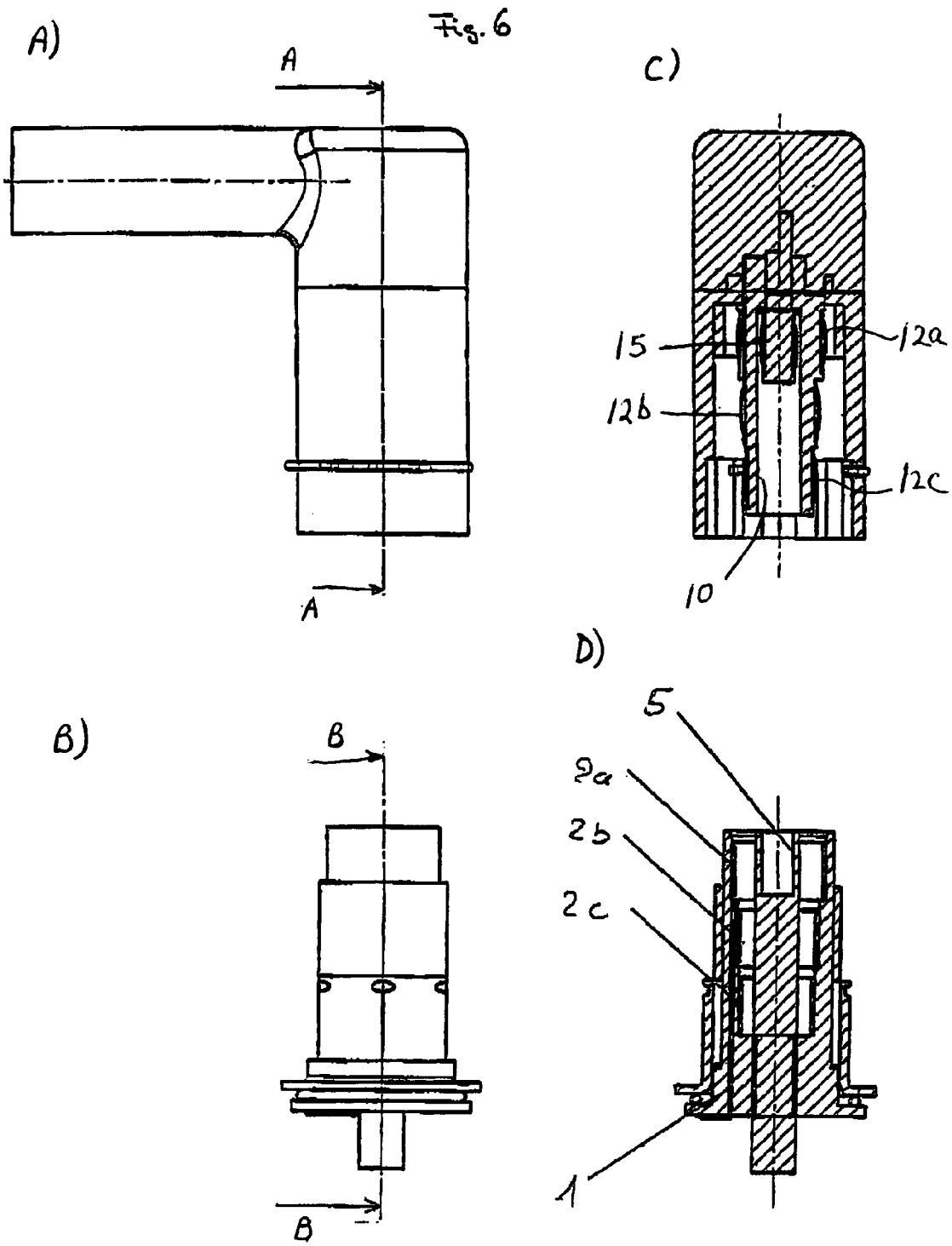
FIGS. 6A & 6B are side views of a fifth exemplary embodiment of the invention with an associated coupling, FIG. 6B being a view from the right to the left in FIG. 6A, FIGS. 6C & 6D are sectional views taken along lines A—A and B—B in FIGS. 6A and 6B, respectively.

For operating the sensor integrated in the glow plug, for example, a pressure sensor built into the glow plug to measure the pressure in the combustion chamber of the internal combustion engine and to evaluate the sensor signals, two to three sensor contacts 2a, 2c are provided depending on the design of the sensor. In the exemplary embodiment shown in FIG. 1, the contacts 2a, 2c are arranged so that a matching connector or a coupling, which is shown on the top left in FIG. 6, can be placed at any angle of rotation over the entire angular range of 360° in order to operate the glow plug with the built-in sensor.

As shown in FIG. 1, the sensor contacts 2a, 2c are arranged externally adjacent to one another in the longitudinal direction of the connector casing 1 in the form of rings arranged on the circumference of the connector casing 1 concentrically to the longitudinal axis of its casing 1. The high-current connection 5 is always located centrally at the center of the connector casing 1.

However, it is also possible to arrange the sensor contacts 2a, 2c on the inside of the connector casing 1 or partly on the outside and partly on the inside of the connector casing 1, as is described in detail below with reference to further exemplary embodiments.

In order to provide protection from environmental influences, especially from moisture, when the matching connector is placed thereon or the coupling is placed thereon, a seal 3, for example, an O-ring seal is provided so that the coupling is sealed with the aid of the seal 3 in positive contact on the connector casing 1 against environmental influences. When putting on the coupling, a mechanism provided on the coupling locates in a locking mechanism 4 provided on the connector casing 1 and increases the withdrawal forces of the coupling or the matching connector. This has the consequence that the coupling or the matching connector can only be withdrawn from the glow plug connector according to the invention by overcoming these withdrawal forces.

The exemplary embodiment of the glow plug connector according to the invention shown in FIGS. 2A, 2B corresponds to the exemplary embodiment shown in FIG. 1 with the exception that two sensor contacts 2b, 2c are arranged on the outside of the connector casing 1 whereas the third sensor contact 2a is arranged on the inside.

Figure 2:
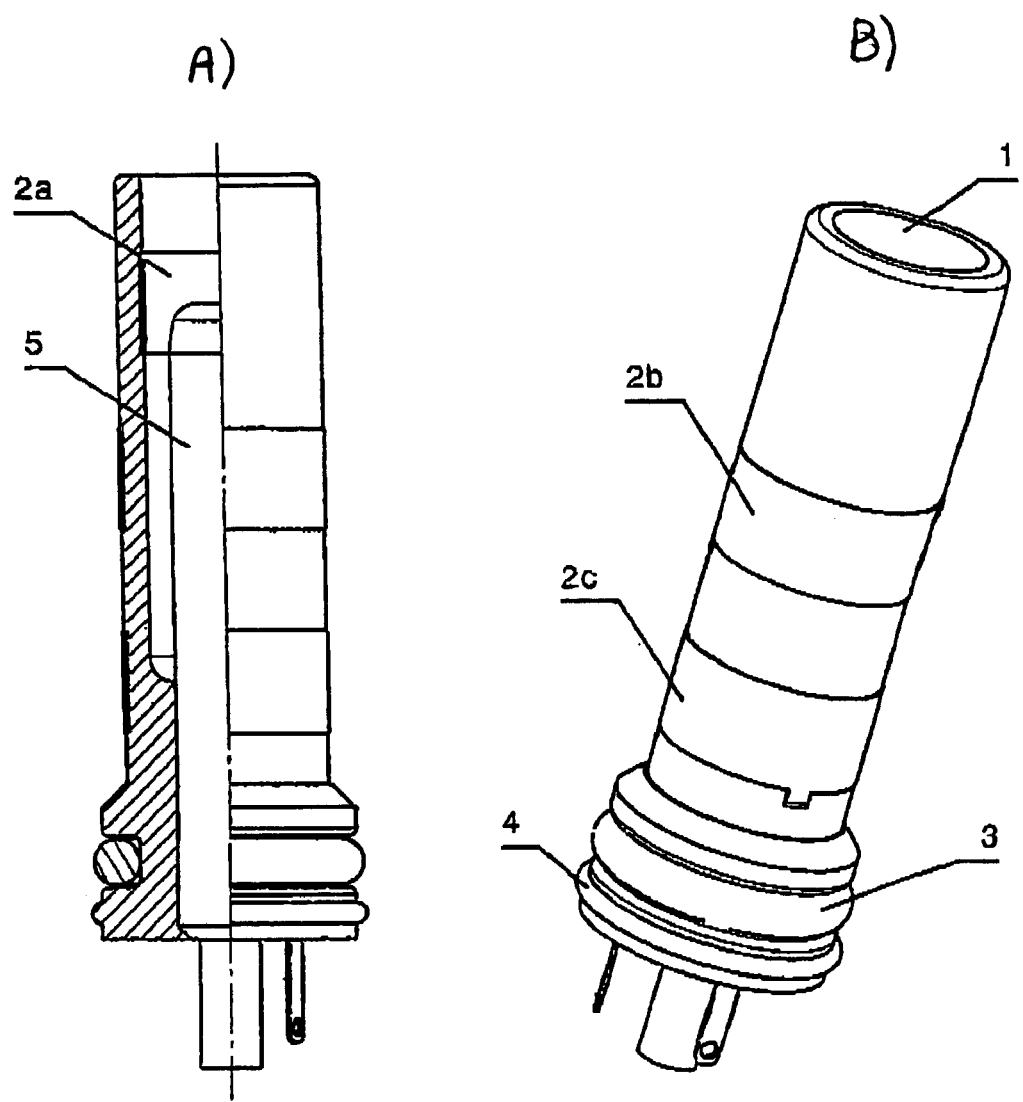
FIGS. 2A & 2B are, respectively, a partial sectional view and a perspective view of a second exemplary embodiment of the invention.
Figure 3:
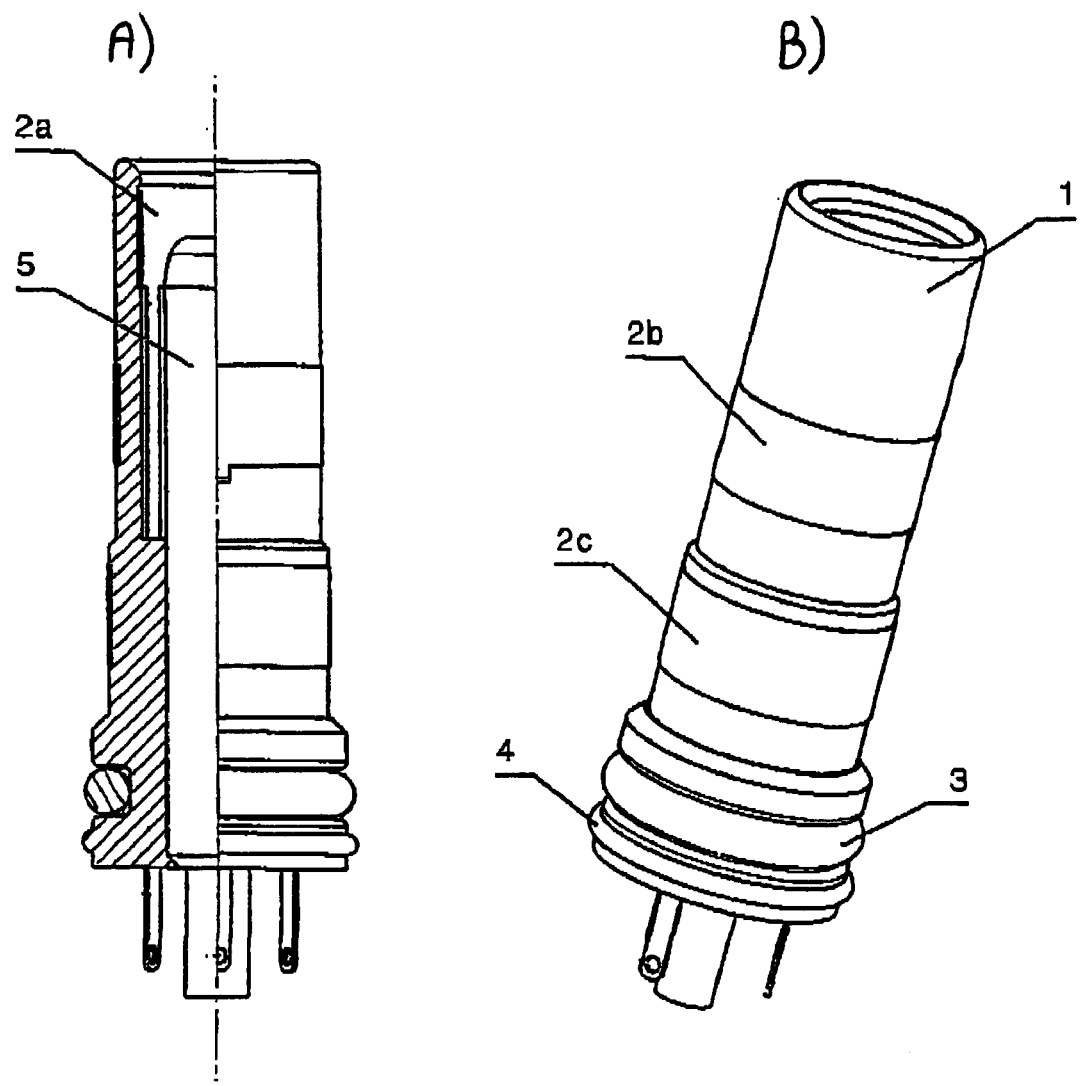
FIGS. 3A & 3B are, respectively, a partial sectional view and a perspective view of a third exemplary embodiment of the invention.

FIG. 3 shows an exemplary embodiment in which, like that of FIGS. 2A, 2B, two contacts 2b, 2c are provided externally and the third contact 2a is provided internally on the connector casing 1. However, in this embodiment, the external contacts 2b, 2c in the form of rings have differently diameters. This means that the sensor contacts 2b, 2c are arranged in a graduated fashion at different diameters which makes it possible to simply assembly of the sensor contacts 2b, 2c.

In all of the exemplary embodiments shown in FIGS. 1 to 3, contact leads connected to the sensor contacts 2a, 2c are guided axially through the connector casing 1 to the connection side of the glow plug so that, when the glow plug connector is put on, they are in communication with the contacts of the sensor. Likewise, the central high-current connection 5 is guided out on the same side and is connected to the high-current connection of the glow plug when the glow plug connector is put on.

FIGS. 4A & 4B show exemplary embodiments of a high-current connection in the form of a spring contact with a spring 6 or in the form of a flexible contact 6', respectively. During operation of the internal combustion engine, this type of design serves to intercept stresses acting on the glow plug, especially on the heating rod. In particular, the flexible glow plug connection acts to insulate against effects of vibrations so that they are not transferred to the contact point as micromovements that can thereby bring about failures.

FIG. 5 shows a fourth exemplary embodiment of the invention in which the sensor contacts 2a, 2b, 2c are no longer distributed in the longitudinal direction of the connector casing and run over 360° in the circumferential direction, but are arranged parallel to the longitudinal axis of the connector casing 1, externally on the circumference of the connector casing 1. This exemplary embodiment no longer allows the plug position to be freely selected but presumes a precisely positioned placement of the coupling for which purpose a coding lug is provided. A variant shown on the in FIG. 5B involves multiplying the number of sensor contacts 2a, 2b, 2c, especially doubling them to obtain an additional plug position.

In the fifth embodiment shown in FIGS. 6C, 6D, the sensor contacts 2a, 2b, 2c are provided internally on the connector casing 1, the coupling 10 shown in FIGS. 6A, 6B being constructed with a central hollow tube having corresponding contacts 12A, 12B, 12C provided on its periphery. The contacts 12A, 12B, 12C come in contact with the sensor contacts 2a, 2b, 2c provided on the inside of the connector casing 1 when the coupling is put on. Provided in the central hollow tube of the coupling is a further contact, namely a high-current contact 15 which comes in contact with the high-current contact 5 of the glow plug connector when the connector is put on.

Figure 7:
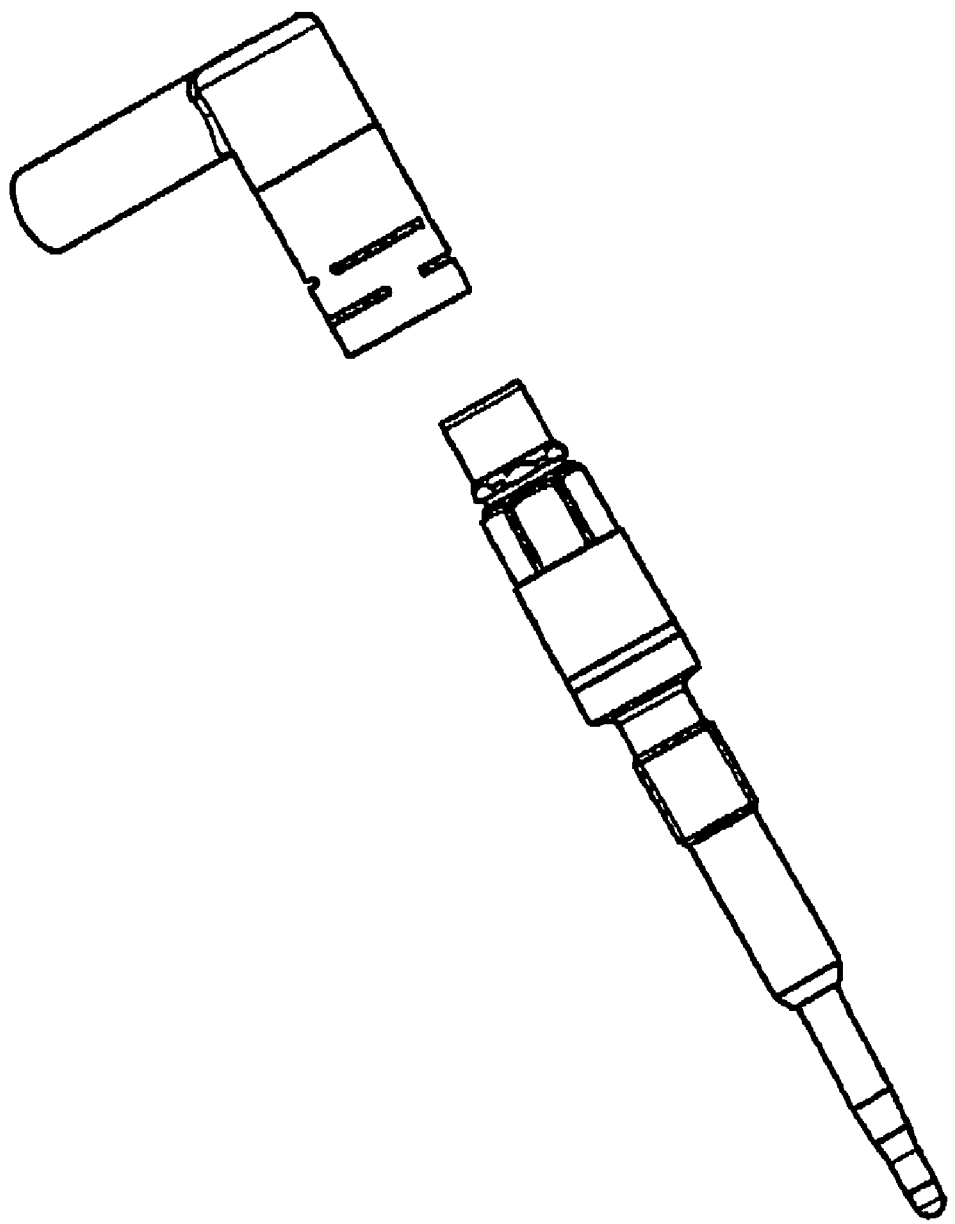
FIG. 7 is an exploded view of the glow plug connector system comprising coupling, glow plug connector and glow plug.

FIG. 7 shows an exploded view of the complete system comprising coupling, glow plug connector and glow plug.

It is characteristic of all the exemplary embodiments of the glow plug connector according to the invention described above that they provide both for the functions of the glow plug, that is their heating devices and also for the functions of the built-in sensor. For this purpose, only a single connector is required on which a coupling is placed for further connection, in which, as usual, a central connection in the form of a spring cage contacts the cylindrical glow plug connection of the glow plug connector.

What is claimed is:

1. A glow plug connector for a glow plug with heating devices and a built-in sensor, comprising:
   a casing made of an electrically insulating material and which is adapted for mounting on a glow plug,
   a high-current connection arranged centrally in the casing and which is adapted for being connected to a high-current contact of the heating devices of the glow plug when the connector is placed thereon and
   sensor contacts which are provided on the casing in a manner that is insulated with respect to the high-current connection and which are adapted for being connected to connections of the built-in sensor of the glow plug when the connector is placed thereon.

2. The glow plug connector according to claim 1, wherein the sensor contacts are provided on the outside of the casing.

3. The glow plug connector according to claim 1, wherein the sensor contacts are provided in the form of rings positioned concentrically relative to a longitudinal axis of the casing.

4. The glow plug connector according to claim 2, wherein the sensor contacts are each arranged on a different diameter portion of the casing.

5. The glow plug connector according to claim 1, wherein the sensor contacts are arranged externally on the casing running parallel to the longitudinal axis of the casing.

6. The glow plug connector according to claim 5, wherein multiple sets of sensor contacts are arranged distributed at a plurality of angular positions around the circumference of the casing.

7. A system comprising a coupling, glow plug connector and glow plug with heating devices and a built-in sensor, wherein the glow plug connector comprises:
   a casing made of an electrically insulating material and which is adapted for mounting on a glow plug,
   a high-current connection arranged centrally in the casing and which is adapted for being connected to a high-current contact of the heating devices of the glow plug when the connector is placed thereon and sensor contacts which are provided on the casing in a manner that is insulated with respect to the high-current connection and which are adapted for being connected to connections of the built-in sensor of the glow plug when the connector is placed thereon.

8. The system according to claim 7, wherein the sensor contacts are provided on the outside of the casing.

9. The system according to claim 7, wherein the sensor contacts are provided in the form of rings positioned concentrically relative to a longitudinal axis of the casing.

10. The system according to claim 8, wherein the sensor contacts are each arranged on a different diameter portion of the casing.

11. The system according to claim 7, wherein the sensor contacts are arranged externally on the casing running parallel to the in a longitudinal axis of the casing.

12. The system according to claim 11, wherein multiple sets of sensor contacts are arranged distributed at a plurality of angular positions around the circumference of the casing.

* * * * *